United States Patent [19]

Lopresti et al.

[11] Patent Number: 5,754,308

[45] Date of Patent: May 19, 1998

[54] SYSTEM AND METHOD FOR ARCHIVING DIGITAL VERSIONS OF DOCUMENTS AND FOR GENERATING QUALITY PRINTED DOCUMENTS THEREFROM

[75] Inventors: Daniel Lopresti, Hopewell; Jeffrey Esakov, Hamilton Square; Jiangying Zhou, Plainsboro, all of N.J.

[73] Assignee: Panasonic Technologies, Inc., Princeton, N.J.

[21] Appl. No.: 495,187

[22] Filed: Jun. 27, 1995

[51] Int. Cl.$^6$ .............. H04N 1/00; H04N 1/40; G06K 9/20; G06F 17/00
[52] U.S. Cl. .......... 358/403; 358/401; 358/470; 358/444; 382/317; 235/375; 235/435
[58] Field of Search ............... 358/401, 403, 358/404, 470, 444, 468; 382/181, 317; 235/375, 376, 435

[56] References Cited

U.S. PATENT DOCUMENTS

| 4,283,621 | 8/1981 | Pembroke | 235/375 |
| 4,893,333 | 1/1990 | Baran et al. | 358/403 |
| 4,994,926 | 2/1991 | Gordon et al. | 358/407 |
| 5,039,847 | 8/1991 | Morii et al. | 235/379 |
| 5,132,808 | 7/1992 | Higuchi et al. | 358/403 |
| 5,448,375 | 9/1995 | Cooper et al. | 358/404 |
| 5,455,648 | 10/1995 | Kazami | 354/106 |

*Primary Examiner*—Edward L. Coles, Sr.
*Assistant Examiner*—Tia M. Harris
*Attorney, Agent, or Firm*—Amster, Rothstein & Ebenstein

[57] ABSTRACT

An inventive page encoding, printing, retrieval and archiving system and method wherein document information designators are encoded for pages. The designator includes information regarding the location of the digital representation of the page and optionally includes page generation and reproduction information. An enhanced copier or facsimile machine scans the printed designator and retrieves the stored digital representation of the page and outputs a "subsequent original" of the page. In the alternative, when the copier cannot directly access the digital representation of the page, the enhanced copier can decode the page generation and reproduction information found in the designator and apply the information to production of a high quality photocopy. The inventive equipment is additionally adapted to create digital representations of pages, create designators for the digital representations, store the digital representations along with the designators, and output printed versions of the pages including the designators.

34 Claims, 4 Drawing Sheets

SYSTEM AND METHOD FOR ARCHIVING DIGITAL VERSIONS OF DOCUMENTS AND FOR GENERATING QUALITY PRINTED DOCUMENTS THEREFROM

FIELD OF THE INVENTION

The invention relates generally to the fields of on-line document generation, facsimile reproduction, document imaging, photocopying, and archiving. More specifically, it relates to the encoding of information in marks on printed documents to facilitate document archiving and reproduction either through on-line storage and retrieval of the document, scanning and reproduction of printed documents utilizing information encoded in marks printed thereon, or scanning and standard reproduction of printed documents to output either a paper or an electronic version of the document.

BACKGROUND OF THE INVENTION

The quality of document reproduction by photocopying has improved greatly in recent years but has, as an underlying defect, the inherent problem that, while an original document can be referred to as the "0th generation," all copies are first generation, at best. Degradation of copy quality is inevitable as copies are made from successive (i.e., first, second, third, etc.) generation copies wherein the cumulative degradation can ultimately result in an unrecognizable document. Ideally, one would like to produce an original-quality document each time reproduction of a printed document by photocopier or facsimile machine is desired.

Photocopying and facsimile transmission improvements have been realized in the technology as evidenced by Japanese Patent No. 05-041811 entitled "Reproduction Method of Color Image and Graphic Processing Device" and U.S. Pat. No. 4,549,219 entitled "Image Information Transmission System."

Another approach to document "reproduction" is to print out the document, provided that there is a digital version of the same resident in a computer, the computer is linked to a printer for outputting a printed version of the document, the user is permitted access to the document and knows how to access the computer-resident version of the document, the original application used to create the document is available, and the document hasn't been edited in the interim. Several Xerox patents, including U.S. Pat. No. 5,060,980 entitled "Form Utilizing Encoded Indications for Form Field Processing," have disclosed a basic scheme for accessing computer-resident version forms by providing a so-called "glyph" on the paper versions of the forms, which glyph represents an encoded pointer to the computer-resident version assuming access, application availability, etc. Once scanned by glyph scanning equipment linked to the computer, the computer uses the pointer information to facilitate processing of handwritten entries to fields on the form.

What is desirable is an enhanced photocopier and/or facsimile machine which can either retrieve and print a new original paper version of a computer-resident document, hereinafter referred to as a "subsequent original," or output a high quality reproduction of the document. It is additionally desirable that a user be able to automatically create and save an electronic version of a document in addition to being able to obtain a paper subsequent original of same. Ease of use of the copier is critical to the invention; and, ideally, all copiers in accordance with the invention will store and retrieve documents in a universal page description language which is not application-specific.

It is, therefore, an objective of the present invention to provide copiers and facsimile machines (hereinafter referred to as "fax machines") capable of retrieving digital representations of stored documents and outputting subsequent originals of documents having inventive indicia printed thereon.

It is another objective of the invention that the above-described copiers and fax machines have the capability of alternatively providing high quality reproductions of documents by scanning and utilizing reproduction information encoded in the inventive indicia provided on the printed document.

It is yet another objective of the invention to provide a method for producing subsequent originals of printed documents having inventive indicia encoded thereon.

Another objective of the invention is to allow a user to automatically save a digital representation of a document, as a scanned bitmap or a page description file, including the inventive indicia encoded thereon or saving a pointer to a previously stored digital representation.

It is also an objective of the invention to provide an enhanced copier system for creating digital representations of scanned documents, said digital representations being appended with the inventive encoded indicia.

Yet another objective is to provide an enhanced copier system capable of preprocessing scanned or computer-resident documents for storage and of encoding inventive indicia therefor.

Still another objective of the invention is to provide printed indicia on an original printed document which has been preprocessed by a computer, said indicia encoding thereon at least document page identification and computer location identification and optionally including document generation information, and/or document reproduction information.

SUMMARY OF THE INVENTION

These and other objectives are realized by the inventive encoding, printing, and document production system and method whereby document information designators, called "DocIDs" are encoded for documents. Each document page has its own unique DocID which uniquely identifies the page, includes computer-resident document location information, and may optionally include document generation and reproduction information.

An enhanced copier scans the printed DocID and retrieves the stored digital representation of the document (e.g., an original wordprocessor source file, assuming that the copier is adapted to run the application which created the file; a bitmap; or a page description file) stored in the computer to which the copier has access and outputs a "subsequent original" of the document. In the alternative, when the copier cannot directly access the digital representation of the document, the enhanced copier can decode the document generation and reproduction information found in the DocID and apply the information to the production of a high quality copy of the printed document. By analogous adaptation, a facsimile machine can access stored source files, bitmaps, or page description files for outputting of subsequent originals. In the alternative, the enhanced fax machine can output enhanced high quality facsimile versions of scanned documents having DocIDs printed thereon. The inventive copier system is additionally equipped to image documents, create and store digital representations of pages, and create DocIDs for the pages.

DETAILED DESCRIPTION OF THE PREFERRED EMBODIMENT

As fully described in co-pending patent applications entitled "Certifiable Optical Character Recognition" (Ser. No. 07/958,938, filed Oct. 9, 1992, now abandoned, and Continuation Application Ser. No. 08/223,830, filed Apr. 6, 1994 now U.S. Pat. No. 5,625,721) and "Method and Apparatus For Providing Reproduction of Printed Documents Enhanced Optical Character Recognition" (Ser. No. 08/138,467, filed Oct. 15, 1993), the contents of which are explicitly incorporated by reference herein, information about the contents, layout, generation, and retrieval of a document can be encoded by a computer when initially generating the document or upon subsequent computer processing thereof. The encoded document information can then be provided via a document marker generated on the face of a printed version of the document. Advanced encoding and print resolution capabilities presently available can accommodate up to 30,000 bits of information in a single square inch of space, while a mere 100 bits of encoded information is more than sufficient to uniquely identify every atom in the known universe. Therefore, as taught by the above-referenced applications, one can theoretically encode the entire document contents, limited only by the amount of space on the document face that one is willing to sacrifice to the document marker. A marker scanner, in conjunction with or wholly separate from an optical page scanner, can locate and scan the marker and provide the information to an associated system equipped with the appropriate recognition and decoding software. The decoded information can then be used by the scanning system to create a new version of the document or to enhance the recognition, reproduction and error correction for the scanned document.

Figure 1:
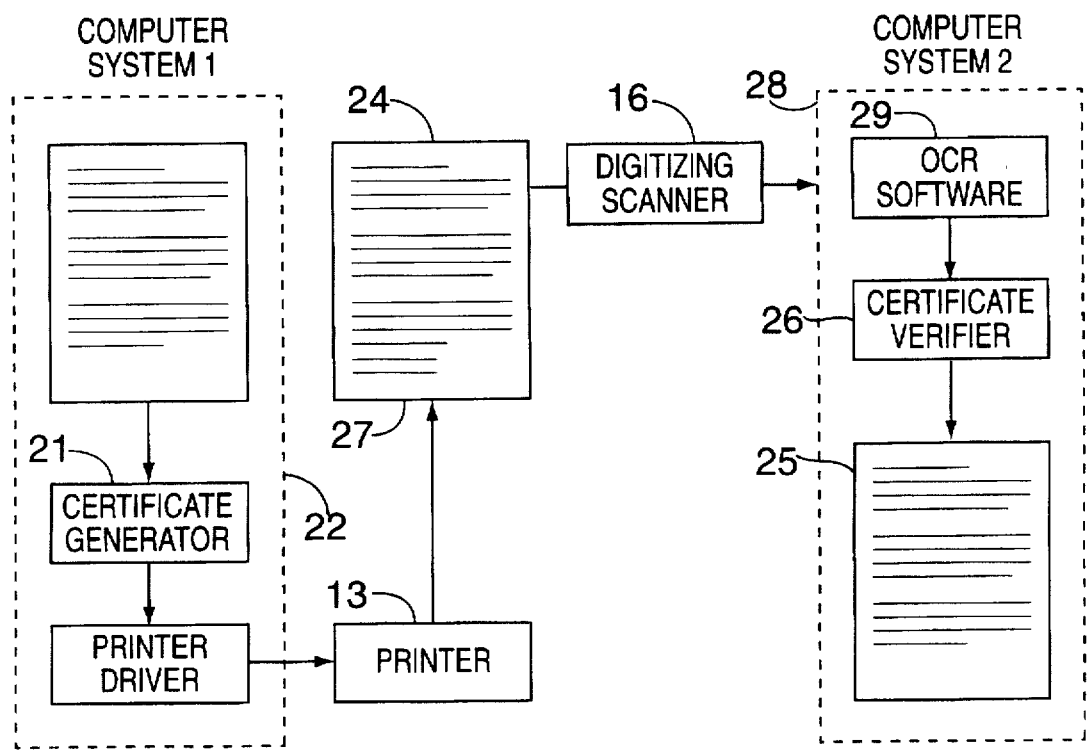
FIG. 1 illustrates a document recognition system in accordance with co-pending applications.

FIG. 1 provides an illustration of the representative enhanced optical character recognition system of the co-pending applications. It is assumed that the above-described system includes a first document generating or document processing computer 22 having document marker encoding software 21, a printer 13 linked to the first computer and equipped to output the document marker 27 with the printed version of the document, a document scanner 16 adapted to scan the document marker, as well as, or separate from scanning of the characters on the document, a second computer 28 having recognition software 29 including software 26 for recognizing and decoding the document marker and for applying the decoded information in producing a second version of the document, and an optional printer (not shown) linked to the second computer for outputting a printed second version.

Figure 2:
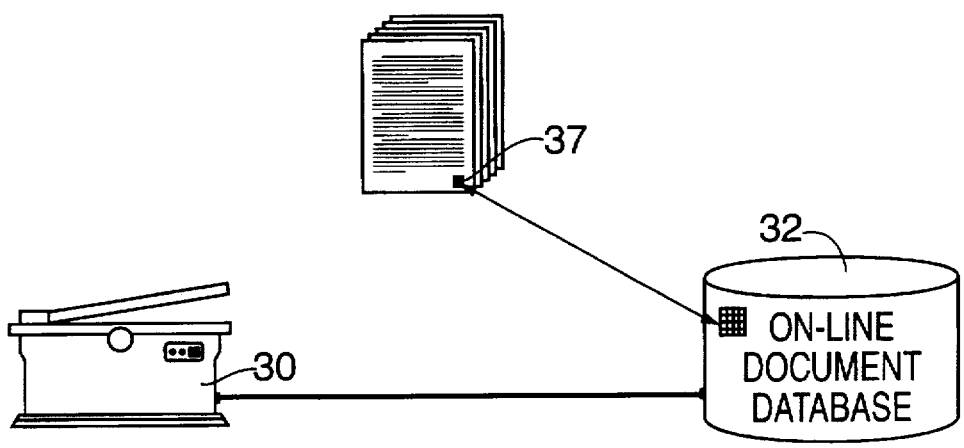
FIG. 2 provides a schematic illustration of a network defined by the enhanced copier and associated computer.

FIG. 2 illustrates the present inventive photocopier. In accordance with the present invention, the document marker scanning capability is incorporated into the photocopier, a so-called perfect copier. As previously mentioned, the invention is extendible to a facsimile machine as well. For ease of description, however, only the copier will be referred to throughout but will, except where otherwise distinguished, refer both to a copier and a fax machine. The perfect copier 30 scans and decodes the DocID located on the document to be reproduced. Although it may be useful to have a separate document DocID printed on the first page of an archived document to facilitate retrieval of an entire multipage document, it is intended that a separate page DocID, uniquely identifying each page, be located on each page of a multipage document.

Upon decoding of the information in the DocID, the DocID software in the perfect copier determines the appropriate process for generating a best available version of the page. The options for generating a best available version of a page include the following: (a) retrieving the file containing the digital representation of the computer-resident page (i.e., the source file, bitmap, or page description file) and outputting a subsequent original version thereof; (b) reproducing the contents of the page by optical character recognition based upon the information found in the decoded DocID; (c) enhanced photocopying of the page by utilizing photocopy parameters identified in the decoded DocID; or, (d) standard photocopying of the page. A perfect copier user may specify the copy mode, as will be discussed further below.

The perfect copier 30 operating in the first mode of retrieving the stored digital representation file for the page locates, scans, and decodes DocID 37 and then accesses the file containing the digital representation of the page by utilizing the decoded information from the DocID to transmit a retrieval request to the storage location, illustrated as archive server 32, at which the file is stored. The retrieval request from a perfect copier includes an identifier uniquely assigned to the copier to establish access, an optional copier user ID, the copier's destination address, the decoded file location information, including the address of the archive server, and the file identification information. Archive server 32, to which the perfect copier is linked, directly or via computer network, retrieves the designated file, from the location indicated by the decoded DocID information, and provides a digital transmission to the copier. The copier receives the digital representation and provides same for output of a subsequent original of the page. The subsequent original of the page is printed with its DocID to facilitate later copying of the page or accessing of the archived version thereof.

In the instance of a fax machine accessing the file having the stored digital representation of the page and sending a digital version of the page for outputting at a second receiving fax machine, the retrieval request identifies the requesting fax machine, the file location and identification information, and destination information for the second, receiving fax machine. As an alternative, the receiving fax machine can obtain a DocID from the sending fax machine or from the transmitted bitmap and thereafter request the digital representation of the page from the archive server.

In the second mode of operation, the copier operates in accordance with the previously-referenced co-pending patent applications by providing enhanced optical character recognition (OCR) based upon information from the decoded DocID. Assuming that the copier cannot access the archived version of the page, it will utilize the next best option for reproducing the page. Through a scan of the DocID, the machine first determines if OCR is necessary, e.g., no scan would be required if the entire contents were encoded in the DocID. If not all of the contents can be reproduced simply by decoding the DocID, the encoded information will otherwise be used to accurately reproduce the page. Obviously, the foregoing second mode is a more costly and time-intensive mode of reproduction than simply photocopying the page, however, for archiving wherein subsequent document manipulation is anticipated, it may be desirable to OCR the page, and invoke DocID encoded error correction information as fully detailed in the aforementioned co-pending applications.

The third mode of operation for the perfect copier involves utilizing information encoded in the DocID to produce an enhanced, high quality photocopy of the page. Photocopying and facsimile reproduction parameters, such as exposure levels, paper size, and paper quality, may be automatically communicated to the perfect copier or perfect fax machine via the decoded DocID. Further detail may include an indication of whether the page contains any photographic (i.e., half-tone) images and whether the page contains any color images or text. Once again, this operating mode is one of the alternative copy modes based upon the assumption that the copier cannot access the digital representation of the page from its storage location, and/or assuming that the user does not require either a subsequent original or full OCR treatment for reproducing the page.

Finally, absent any DocID printed somewhere on the page to be reproduced, or absent the availability or need of implementing any of the aforementioned options when a DocID is available, the page may be reproduced in accordance with standard photocopying or fax reproduction technology.

Additional functionality which can be realized by implementing the present invention includes: output of an entire, multipage document based upon scanning of a document DocID or of a page DocID located on only one page of the document; output or replacement of missing pages from a document for which a document ID or any one page DocID is available; and, output of subsequent originals for torn or otherwise damaged pages and/or multipage documents. Redundancy of encoded information at various locations on a page can facilitate the latter reproduction scenario, wherein a single DocID location may have been torn away or obliterated.

Figure 3:
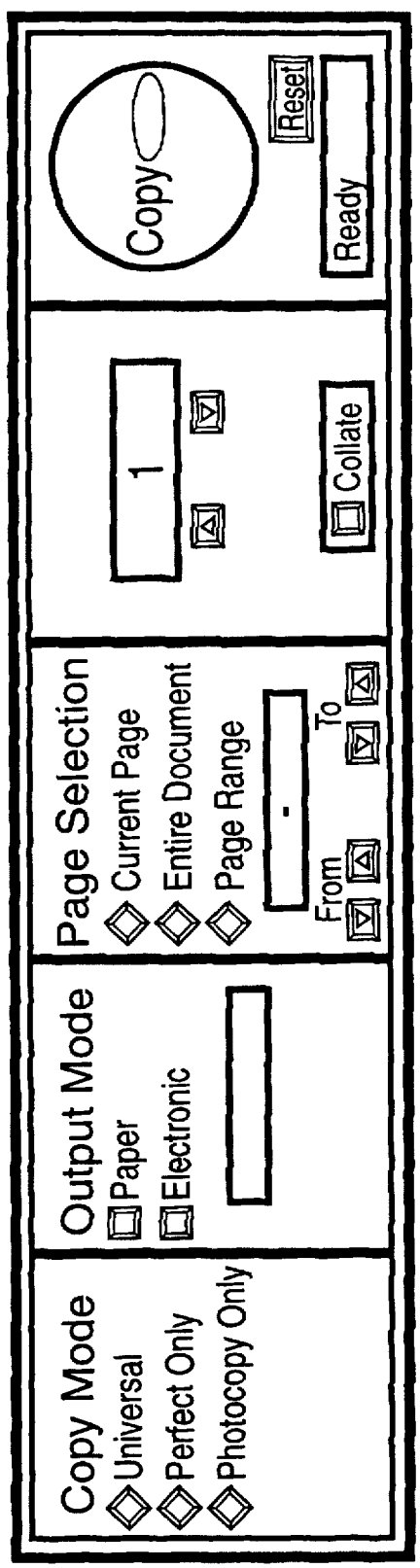
FIG. 3 illustrates a representative display panel for a perfect copier in accordance with the present invention.

A user may select the "Copy Mode" and "Output Mode" when utilizing the inventive copier 30. FIG. 3 provides a representative display panel 32 for a perfect copier. For the "Copy Mode," the user may select "Perfect Only," which option indicates that the user wishes to obtain a subsequent original of the page which has been placed on the glass of the copier. Unless the copier can find and decode a DocID for the page, the copier will not provide any output for the user. In addition, even if the copier locates and decodes a DocID for the page, if the copier cannot access the archive server, or other storage location at which a digital representation of the page resides, a subsequent original cannot be generated.

Access to an archive server can be strictly controlled by its owner (e.g., a publishing house, a library, a university, etc.) whereby only subscribers with verifiable access codes can request and receive transmissions of digital representations of pages which are resident thereon. Royalty collection for receipt of subsequent original pages and documents can readily be tracked and executed in such a subscriber-access system. In addition, a user-subscriber can not only obtain a subsequent original of a page or document, but may also access earlier or subsequent versions of a revised page or document, provided that the archive server cross-references its files and DocIDs in such a manner as to facilitate retrieval of related files, and assuming a functionality at the copier by which the user can communicate the desire to obtain the latest version of the page or document. Additional subpanels or screens of options can readily be provided at the perfect copier along with appropriate software to prompt a user with regard to alternative page and version selection, as is well within the purview of one having skill in the art.

Since a document DocID may be used for a multipage document in addition to each unique page DocID, the copier panel may additionally include the "Page Selection" display illustrated in FIG. 3. From the decoded DocID, the copier can obtain the document length and display the number of pages at the "Page Range" window. The user can then adjust the page range to indicate which pages are to be output. In this manner, a user can readily replace missing or damaged pages of a multipage document without having to reproduce the entire contents of the multipage document. Assuming that the archive server has linked successive versions of the stored page or pages of a document, another option can be communicated to the user for choosing one or more of the stored versions of the page or document, whereby the user can obtain an entire document history or simply obtain the most current information.

Assuming the "Perfect Only" copy mode has been selected and that the copier successfully accesses the archive server on which the digital representation of the page resides, the digital representation of the page is provided from the server to the copier. The copier then re-creates the page, be it a source file, bitmap, or page representation file, along with its DocID, as an analog version and prints the subsequent original including a printed DocID.

Of course, the user may opt for "Photocopy Only" mode to simply photocopy any page, thereby settling for a standard, next generation photocopy of the page, and necessarily avoiding any concerns of access and copyright royalties or subscription fees. Selection of the "Photocopy Only" mode will invoke standard photocopying procedures to obtain a next generation version of the page, in accordance with the prior art in the photocopying technology. Any DocID on the page being copied will, necessarily, be reproduced on the photocopy. However, the degeneration of quality and clarity may negatively impact the usefulness of the DocID for future retrieval. To counter balance the potential degradation, DocID's are provided with error correcting codes and redundancy encoding in order to maximize subsequent decoding thereof.

Finally, the "Universal Mode" can be chosen whereby the copier provides printed output of the page to be generated according to the best available method. If the page has a DocID and the copier can access the archive server or other storage location on which the digital representation is resident, a subsequent original will be output. If the page has no DocID, a photocopy will be made. In the Universal Mode, however, the copier can invoke the other two reproduction options discussed above, that of enhanced optical character recognition of the page, or that of enhanced photocopying of the page. Using information encoded in the DocID, the copier can optimize its output, even when it cannot access the storage location on which the digital representation of the page resides. The copier decodes the DocID to obtain copy parameters, page layout, etc., for use in reproducing the image on the page. Enhanced OCR could also be performed in accordance with the teachings of the aforementioned patent applications; although, as mentioned above, the commercial applications of enhanced OCR at a copier are somewhat limited in light of the increased time and cost of performing OCR.

The user may also select the "Output Mode" to designate "Paper", "Electronic" or "Paper and Electronic" output. Clearly, selection of the "Paper" option indicates that the user wishes to obtain a hard copy of the page, whether a subsequent original, enhanced photocopy, or standard photocopy. The "Electronic" output option provides a user with the ability to electronically save a digital representation of the page which is provided at the imaging surface of the photocopier, scanner, fax machine, etc. If the user has chosen the "Perfect Only" copy mode and the "Electronic" output mode, the copier will obtain the previously stored digital representation of the page from the appropriate remote archive server and save that digital representation either at a local archive server, at a local computer associated with the copier, on a permanent storage location at the copier itself, or on a removable storage media associated with the copier. Saving, or archiving, the digital representation of the page additionally involves not only a step of obtaining a digital representation of the page, by either digitizing the page or retrieving a previously stored digital representation, but also the steps of physically reading that digital information to a storage location, and creating a DocID for the stored information. In the instance of a digital representation which had already been stored on and retrieved from another archive server, and is now to be stored locally, the new DocID may include a pointer to the original archive server, along with new information about its local storage location. In the alternative, what is stored locally may simply be the pointer to the archive server at which the digital representation is stored, thereby maximizing utilization of locally available storage.

Another mode by which a paper will be archived is by selection of "Photocopy Only" and "Electronic" mode. Rather than attempting to access an existing digital representation of the page, the copier will create and save a new digital representation. Such may be a particularly useful mode for saving pages which have been annotated by the user. The copier will save a bitmap of the page, as annotated, which bitmap includes the original content data, the original DocID (if one is present), and the added annotations. In effect, therefore, the copier acts as a flatbed scanner input device for the computer network. However, in storing the bitmap, the copier or the archive server will assign a new DocID to the newly stored digital representation. Since the "Photocopy Only" mode does not invoke the DocID decoding software, there will not be any cross-reference or linkage of any original and the newly cited digital representations of the paper. Clearly, however, the document management software at the archive server could be modified to decode and link DocIDs even without conducting the step of obtaining the "original" digital representation of the page from a remote storage location.

Figure 4:
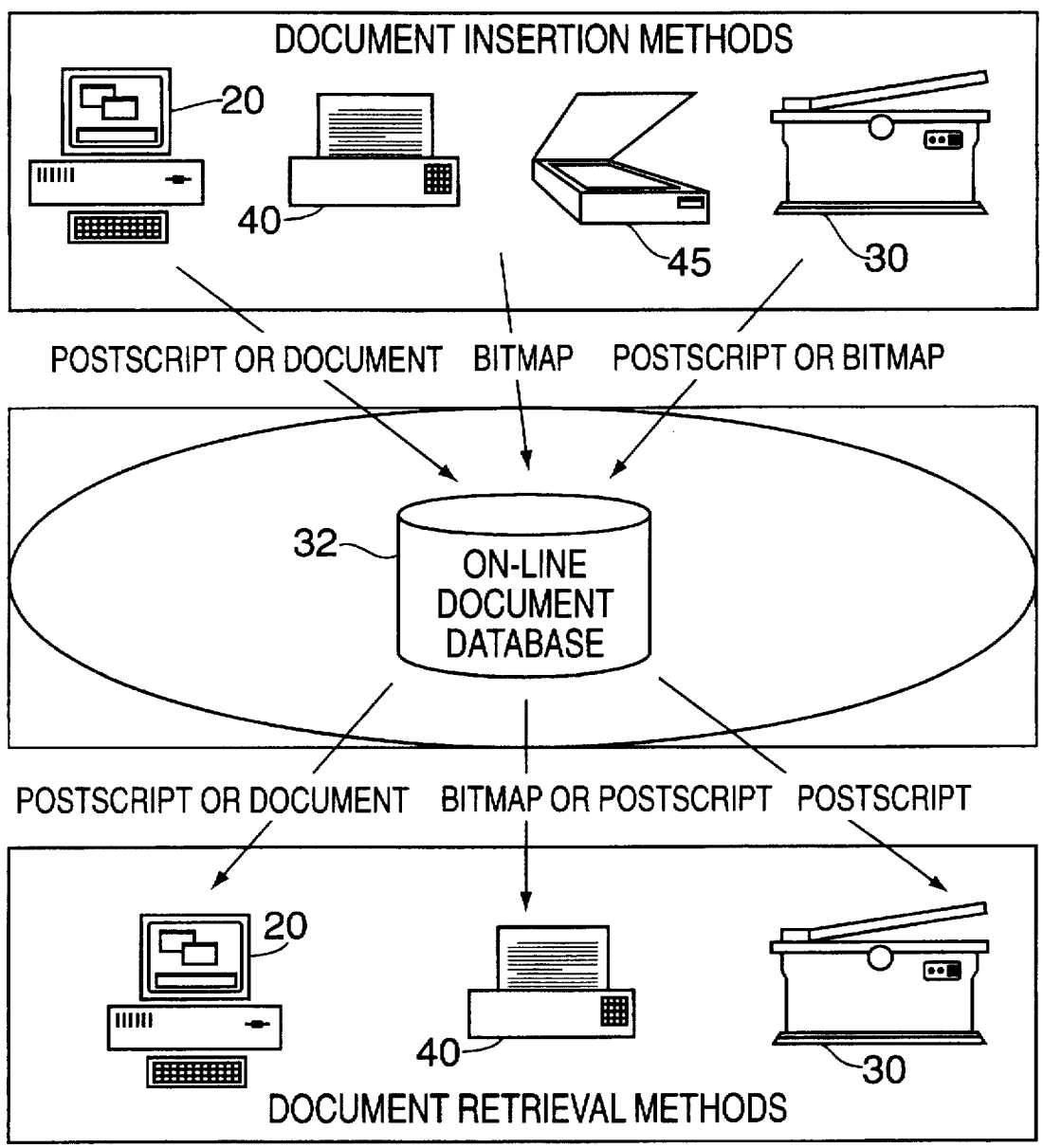
FIG. 4 illustrates a comprehensive input, archiving, and outputting system in accordance with the present invention.

As illustrated in FIG. 4, digital representations of pages can be entered into the archives by the copier scanning method detailed above, the copier accessing of digital representations from remote archive servers, also discussed above, or through standard flatbed scanning, facsimile machine bitmap scanning, or computer generation of the page, wherein each of the scanning or inputting operations is followed by a two step archiving protocol. Assuming a "Paper and Electronic" output mode for a copier, and a corresponding "Print and Archive" output mode for a computer, the copier or computer sends a message to the archive server indicating that a new digital representation is being created and requesting a unique DocID for it. The copier or computer may also provide the archive server with OCR and ECC information for incorporation into the DocID, or such encoding may later be appended to the DocID at the copier or computer. The archive server allocates space for the digital representation, generates a new DocID including the location and transmits the DocID back to the copier or computer. The user's copier or computer receives the DocID and incorporates the DocID into the digital representation of the page. The copier or computer then effects printing of the page, including the DocID and simultaneously transmits a digital representation of the page to the archive server.

In a network of devices, the DocID creation software could be provided to each of the input devices, however, the archive server must identify the storage location at which the digital representation will be stored and provide the location information for inclusion in the DocID. The DocID may also include identification of the person who generated the page, input location, input parameters, indicia for identifying the page, a page count for multipage documents, archive destination information, and cyclic redundancy check (CRC) and error correcting codes (ECC). As an alternative to the server generating a new DocID for each new page, the server may issue a "bank" of DocID's which the user's computer or copier may assign to created pages as needed. In issuing a "bank" of DocIDs, the archive server commits certain storage locations for the subsequently-transmitted digital representations, more realistically, for pointers to the ultimate storage locations of the later-saved digital representations. The archive server stores the digital representations of each page according to its DocID and provides storage management, document management, security, and accounting functions relative to the pages.

Although the manner in which the page is archived is not critical to the retrieval thereof, several archiving options involve saving the page from a scan at the inventive perfect copier or perfect facsimile machine. Software can be installed at the copier or fax machine to scan and digitize the relevant page for transmission to a storage location, to append a DocID to the digital representation, and to transmit the digital representation (e.g., bitmap file or page description files) with the DocID to a storage location at an associated computer and/or archive server. When the output mode is "Electronic," DocID creation can be done after transmission of the digital representation to the computer and/or archive server.

A computer at which a page is generated, may be adapted to include not only the familiar "Store" or "Save" feature but also a specific "Archive" function or "Print and Archive" function by which the storage location and other relevant page information are encoded in a DocID which is both saved with the digital representation and output whenever a subsequent original of the page is printed or whenever the file is provided to an associated component or user. Page bitmaps can be created and archived by fax machines, document scanners, and copiers adapted in accordance with the present invention. The bitmap, the DocID, or both which are created when scanning can be saved locally (i.e., at the scanning component) if sufficient local storage is available; can be stored on some form of removable media (e.g., a writable optical disc or floppy disc); or, can be provided for storage at the remote location. As noted above, the DocID can be created at the remote storage location rather than at the scanning or copying location.

Ideally, an overall network of perfect copiers, perfect fax machines, computers, and printers can be connected to an on-line document database, the archive server 32 of FIG. 2, at which sufficient storage is available for all documents within the network. Multiple networked archive servers and on-line document databases, perhaps distributed geographically throughout the world, may be connected to perfect copiers via one or more computer networks. The on-line document database will be adapted to provide storage management (e.g., compression and attendant functionality for maximizing storage and facilitating access to stored documents); document management including, for example, page choice and version control; security for verifying user ID's thereby permitting access to stored documents only to designated users; and accounting to monitor copyright royalties and any other page access and reproduction fees as may appropriately be incorporated into the archive network management system.

Figure 5:
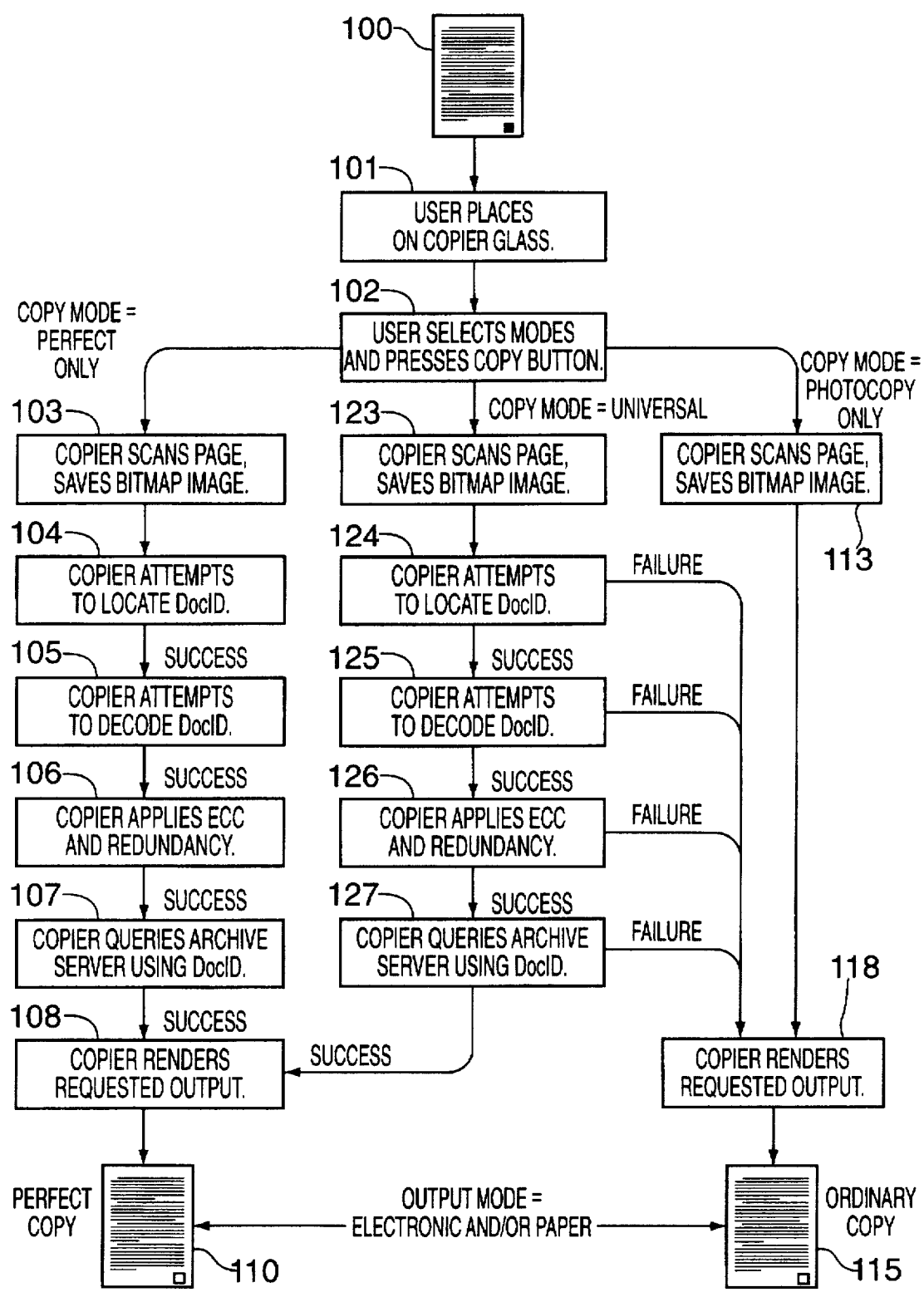
FIG. 5 illustrates a process flow representatively used by an enhanced photocopier in accordance with the present invention.

FIG. 5 illustrates a representative process flow for use by the "perfect copier". At step 101 the user places page 100 on the glass of the copier. At step 102, the user selects the "Copy Mode". For purposes of this description, selection of one or another of the output modes does not affect the process flow until the last step. In the "Perfect Only" copy mode, the copier scans the page and saves the bitmap image at step 103 and, at step 104 attempts to locate the DocID. Since the "Perfect Only" mode does not have a default mode, the process flow will stop if no DocID is located in step 104. If step 104 is successful, the DocID is decoded at step 105, and any ECC and redundancy checks found in the DocID are applied at 106. Assuming successful processing at steps 105 and 106, the copier contacts the archive server, at step 107, to retrieve the digital representation of the page. Upon successful receipt of the digital representation from the archive server, the copier generates the requested output at step 108. As discussed above, generation of the requested output may be either archiving the digital representation and a DocID therefore, or generating a paper comprising the page.

If the "Photocopy Only" mode has been selected, the copier also begins by scanning the page and saving a bitmap image thereof at step 113. The copier subsequently generates the requested output by either archiving the scanned bitmap or reproducing the scanned bitmap on paper at step 118. The "ordinary copy" 115, i.e. a next generation version of the paper will be generated in the "Paper" output mode.

For the "Universal Mode", the copier scans the page and saves the bitmap at step 123. Thereafter, the copier attempts to follow the process flow for the "Perfect" copy mode. Steps 124–127 include locating, decoding, applying error correction and redundancy checks to the DocID and accessing the archive server. If any one of the steps is unsuccessful, the copier defaults to outputting the scanned bitmap at 118, in either the "Paper" or "Electronic" output mode.

While the invention has been described with reference to a preferred embodiment, it is to be understood that various different modifications are possible and are contemplated as being within the spirit and scope of the invention, as set forth in the appended claims.

What is claimed is:

1. A system for producing a high quality paper version of a page provided to an image generating portion thereof, said system comprising:

scanning means for scanning said page to locate encoded indicia on said page;

means for decoding encoded indicia located on said page to ascertain an address at which a stored digital representation of said page can be accessed;

means for accessing said stored digital representation of said page with said address; and means for outputting a paper version of said page from said accessed stored digital representation or by photocopying said page when no encoded indicia are located thereon.

2. The system of claim 1 wherein said means for scanning further comprises means for generating a digital representation of said page.

3. The system of claim 2 further comprising means for encoding indicia about said generated digital representation of said page.

4. The system of claim 3 further comprising means for saving said generated digital representation of said page and said indicia.

5. The system of claim 4 wherein said means for saving said generated digital representation of said page and said indicia comprises at least one storage location and at least one means for cataloging said indicia for subsequent access thereto.

6. The system of claim 3 further comprising means for providing said generated digital representation of said page and said indicia for storage in at least one remote storage location.

7. The system of claim 1 further comprising means for applying said decoded indicia to enhance outputting of said paper version.

8. The system of claim 1 wherein said means for scanning comprises means for performing optical character recognition on said page and further comprising means for applying said decoded indicia to enhance said optical character recognition.

9. The system of claim 1 wherein said at least one storage location comprises a remote storage facility wherein said means for accessing said stored digital representation of said page comprises:

means for establishing communication with a remote storage facility;

means for assembling at least one request packet including at least address and page identifying information for transmission to said remote storage facility;

means for transmitting said at least one request packet to said remote storage facility; and means for receiving said at least one stored digital representation of said page.

10. The system of claim 1 wherein said means for outputting a paper version comprises means for converting said accessed digital representation to an analog version of said page.

11. A facsimile system for communicating at least the content data of a page, provided thereto said page optionally having encoded indicia containing an address at which a stored digital representation of said page can be accessed, said system comprising:

scanning means for scanning said page;

means for recognizing said encoded indicia on said scanned page, when present;

means for decoding said encoded indicia recognized on said scanned page to ascertain said address;

means for accessing said stored digital representation using said address; and means for receiving said stored digital representation.

12. The facsimile system of claim 11 further comprising digitizing means for digitizing the content data of said scanned page to create a digitized representation if no encoded indicia are recognized.

13. The facsimile system of claim 12 further comprising means for transmitting one of said stored digital representation or said digitized representation of said page.

14. The facsimile system of claim 11 further comprising at least one storage location including a remote storage entity and wherein said means for accessing said stored digital representation comprises:

means for establishing communication with said remote storage entity at which said digital representation is stored;

means for assembling at least one request packet including at least said address and page identifying information from said decoded indicia; and for transmitting said at least one request packet to said remote storage entity.

15. The facsimile system of claim 12 further comprising means for encoding indicia about said digitized representation of said page.

16. The facsimile system of claim 13 further comprising means for archiving said digitized representation of said page and said indicia.

17. The facsimile system of claim 14 wherein said means for archiving said digitized representation of said page and said indicia comprises at least one storage location at said facsimile machine and at least one means for cataloging said indicia for subsequent access thereto.

18. The facsimile system of claim 13 further comprising means for providing said digitized representation of said page and said indicia for storage in at least one remote storage location.

19. The facsimile system of claim 11 further comprising:

means for receiving at least one digital transmission comprising at least content data from at least one remote facsimile machine;

means for converting the content data of said at least one digital transmission to analog data; and means for outputting said analog data as a paper version of said page.

20. The facsimile system of claim 19 wherein said scanning means and said decoding means are adapted to scan received digital transmissions to identify encoded indicia and to decode encoded indicia identified therein.

21. The facsimile system of claim 18 further comprising means for applying said decoded indicia to enhance outputting of said paper version of said page.

22. The facsimile system of claim 11 wherein said means for scanning comprises means for performing optical character recognition on said page and further comprising means for applying said decoded indicia to enhance said optical character recognition.

23. The system of claim 1 wherein said digital representation of said page includes page description data having source data and formatting instructions for formatting said source data, and said means for outputting applies said formatting instructions to output said paper version in accordance therewith.

24. The system of claim 1 wherein said digital representation of said page includes source data, and said means for outputting outputs said paper version in accordance with said source data.

25. The system of claim 1 further comprising means for accessing related information relating to said scanned page with said address.

26. The system of claim 25 wherein said related information includes document information identifying a document associated with said scanned page and said means for outputting is adapted to output one or more pages of said document identified by said related information.

27. The system of claim 26 wherein said means for outputting is adapted to output one or more pages of said document identified by said related information and selected in response to selection input to said photocopying system.

28. The system of claim 25 wherein said related information includes document version information relating to one or more document versions associated with the content data of said scanned page and said means for outputting is adapted to output at least one page contained in said one or more document versions identified by said related information.

29. The system of claim 28 wherein said means for outputting is adapted to output at least one page of a document version identified by said related information and selected in response to selection input to said photocopying system.

30. The system of claim 11 when said means for accessing accesses related information relating to said scanned page with said address, and said means for receiving is adapted to receive said accessed information.

31. The system of claim 30 wherein said related information includes document information identifying a document associated with said scanned page and said means for accessing is adapted to access one or more pages of said document identified by said related information.

32. The system of claim 31 wherein said means for accessing is adapted to access one or more pages of said document identified by said related information and selected in response to user selection input to said system.

33. The system of claim 30 wherein said related information includes document version information identifying one or more document versions associated with the content data of said scanned page and said means for accessing is adapted to access at least one page contained in said one or more document versions identified by said related information.

34. The system of claim 33 wherein said means for accessing is adapted to access at least one page of a document version identified by said related information and selected in response to a selection input to said system.

* * * * *